Figure 1:
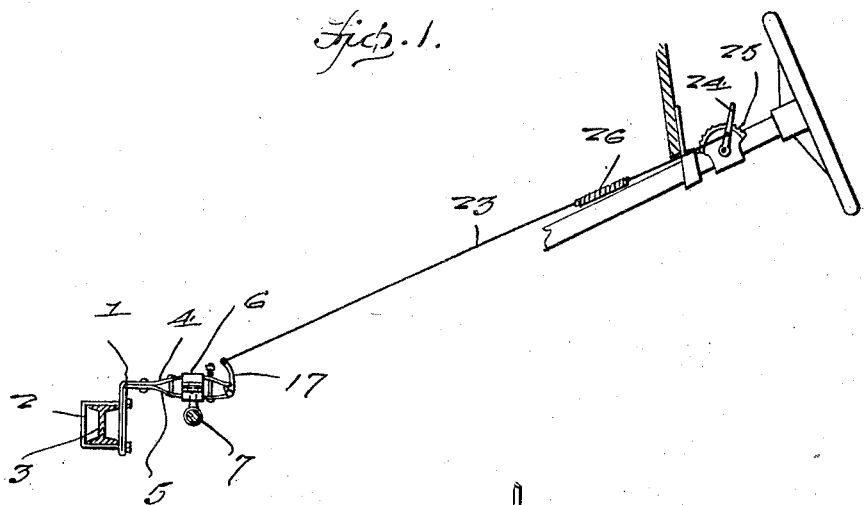

May 11, 1926.

V. BARES

STEERING GEAR HOLDER

Filed July 31, 1925

1,583,952

2 Sheets-Sheet 1

Inventor
V. Bares
By Clarence A. O'Brien
Attorney

May 11, 1926.
V. BARES
STEERING GEAR HOLDER
Filed July 31, 1925
1,583,952
2 Sheets-Sheet 2
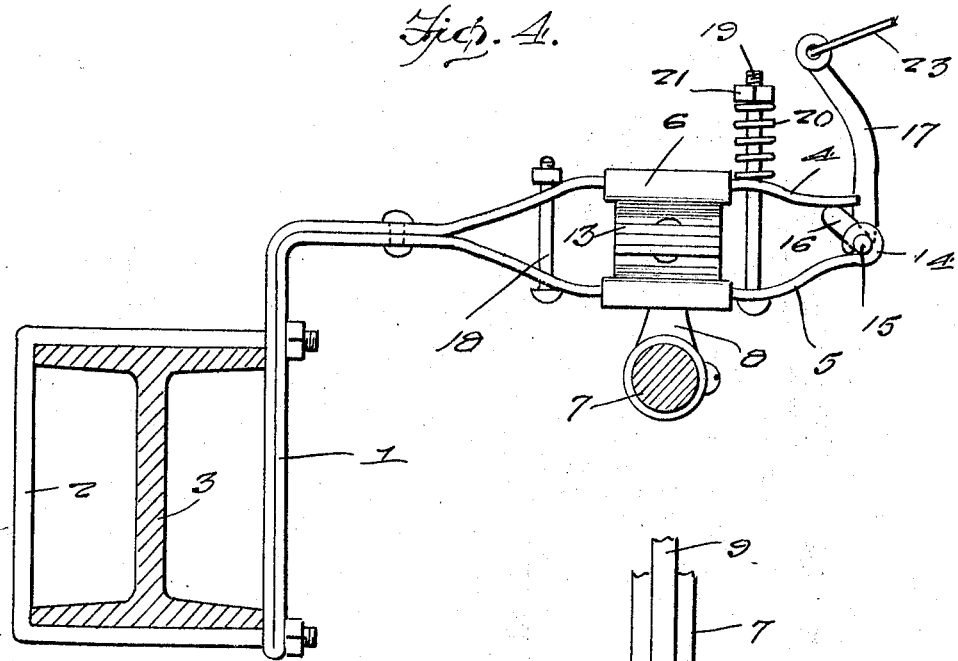
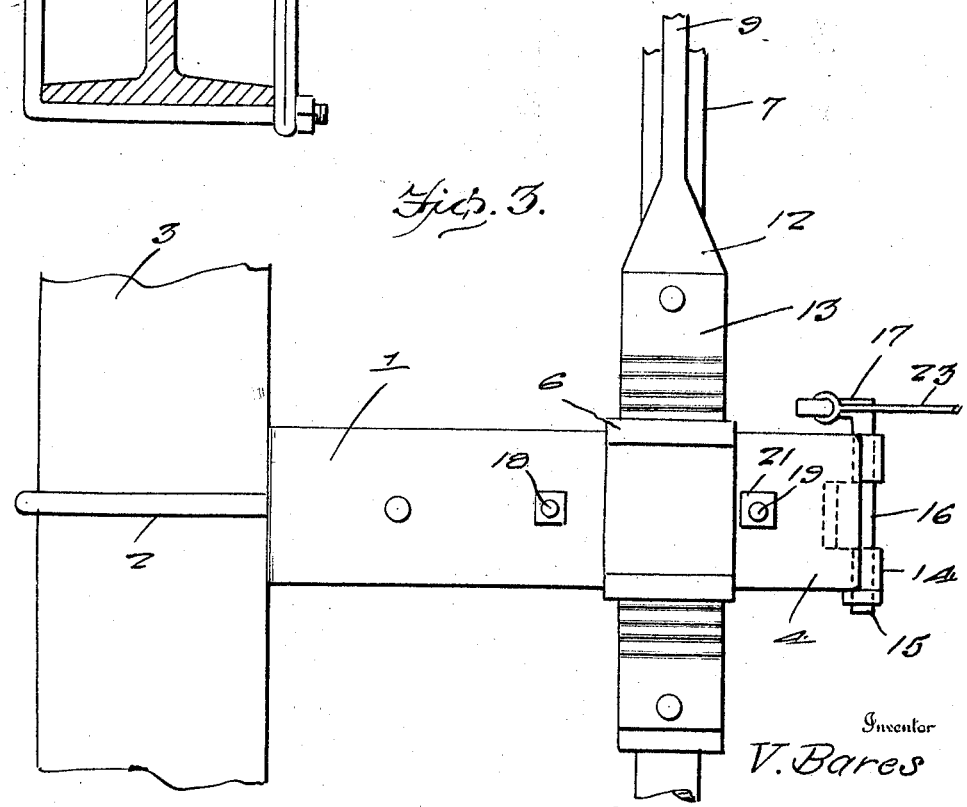
Inventor
V. Bares
By Clarence A. O'Brien
Attorney Patented May 11, 1926.

1,583,952

UNITED STATES PATENT OFFICE.

VACLAV BARES, OF SCHULENBURG, TEXAS.

STEERING-GEAR HOLDER.

Application filed July 31, 1925. Serial No. 47,303.

This invention relates to steering gear holders especially adapted to be applied to automobiles, and has for its principal object to improve upon the structure shown in my allowed application, filed September 15, 1924, and assigned Serial No. 737,868.

A particular object of the invention is to provide means whereby the steering gear holder may be controlled by the driver of the automobile either to place it in an operative or an inoperative position.

A still further object of the invention is to generally improve upon structures of this nature by simplifying the same and making the same more efficient and reliable.

With the above and numerous other objects in view as will appear as the description proceeds, the invention resides in certain novel features of construction, and in the combination and arrangement of parts as will be hereinafter more fully described and claimed.

In the drawing—

Figure 2:
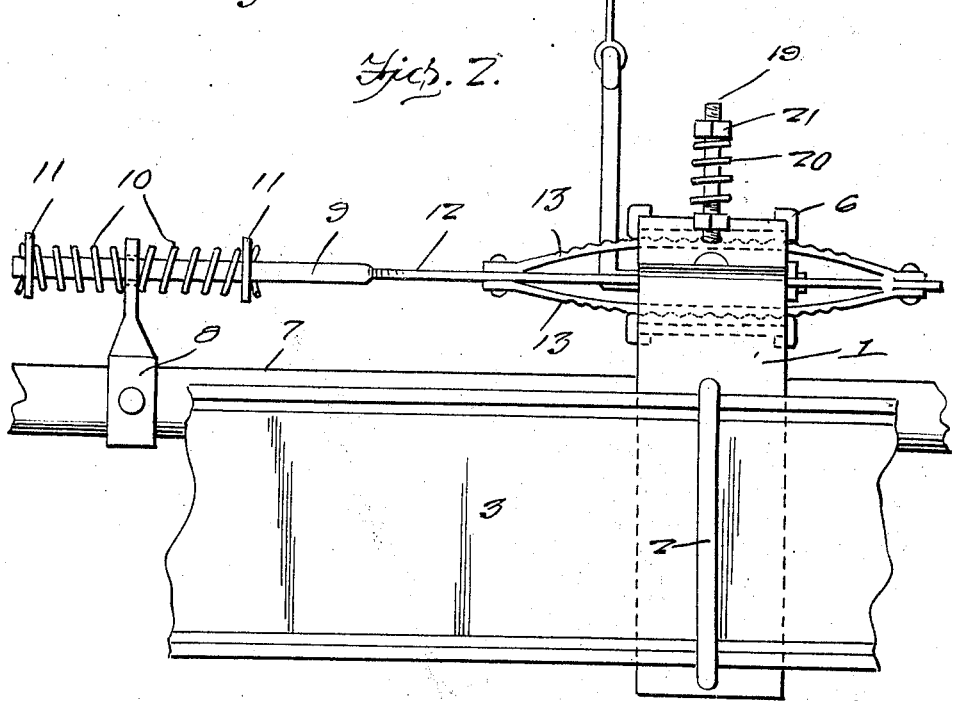

Figure 1 is a sectional view through the front axle of an automobile, showing other parts of said automobile and my improved steering gear holder associated therewith, Fig. 2 is an enlarged fragmentary front elevation thereof, Fig. 3 is a side elevation thereof, and Fig. 4 is a top plan view thereof.

Referring to the drawing in detail, it will be seen that 1 designates a bracket which is secured by means of a clip 2 to the front axle 3 of the automobile. The bracket 1 is provided at its end with upper and lower arcuate arms 4 and 5 respectively on which are mounted shoes 6. Said shoes are provided at their inner surfaces with transversely disposed corrugations.

A collar 8 is clamped in position upon the cross rod 7 of the steering gear of the automobile. A rod 9 is movable through the collar 8 and springs 10 are disposed thereon one on each side of the collar and suitable abutments 11 are provided on the rod 9 to engage the ends of the springs 10 so that said springs tend to hold the collar centrally of said abutments 11. The rod 9 merges into a flattened extension 12 on which are disposed arcuate strips 13 having outer transverse corrugations for engagement with the corrugations of the shoes 6. The parts thus far described are very similar to those shown in my aforementioned application, but have been varied somewhat to operate properly with the improvements about to be described.

As is shown particularly in Fig. 4, the lower arm 5 rotates in an eye 14 for rotatably receiving the pintle 15 of a cam 16 operable by a crank 17 so that said cam may be brought into engagement with the upper arm 6 thereby separating arms 4 and 5 and disengaging shoes 6 from the arcuate strips 13. Bolts 18 and 19 pierce the arms 4 and 5 and bolt 19 has a spring 20 thereon between its nut 21 and the arm 4 and tensioned to normally hold the arms toward each other with the shoes 6 engaged with the strip 13.

A connecting member 23 is engaged with the crank 17 and with the lever 24 associated with a suitable notched quadrant 25 in the usual manner so that it may be held in different positions. A spring 26 is preferably incorporated in the connecting member 23. This quadrant and lever are mounted on the steering post adjacent the steering wheel so that the mechanism may be conveniently operated by the driver of the car.

It is thought that the construction, operation, and advantages of this invention will now be clearly understood by those skilled in this art, and especially those familiar with my above mentioned application. It is apparent that numerous changes in the details of construction, in the combination and arrangement of parts may be resorted to without departing from the spirit or scope of the invention as hereinafter claimed, or sacrificing any of its advantages.

Having thus described my invention, what I claim as new is:—

1. A steering gear holder for an automobile comprising a support, spaced shoes carried by the support and having corrugations, a pair of opposed bowed strip members provided with corrugations which engage the corrugations of the shoes, means for mounting the strip member, and means operable to separate the spaced shoes to disengage them from the bowed strips.

2. A steering gear holder for an automobile comprising a support in the form of a bracket terminating in spaced arms, shoes on said arms, a member disposed between the shoes and engageable therewith, means for supporting the member, means normally urging the arms so that the shoes engage said member, means for separating said arms to disengage said shoes from said member, said last mentioned means comprising a cam pivoted on the end of one arm and engageable with the end of the other arm, and a mechanism for swinging said cam to separate the arms.

In testimony whereof I affix my signature·

VACLAV BARES.